(12) United States Patent
Stubenruss

(10) Patent No.: US 10,800,084 B2
(45) Date of Patent: Oct. 13, 2020

(54) GRANULE/LIQUID FLOW ADJUSTING DEVICE FOR 3-D PRINTER HEADS SUPPLIED WITH GRANULES AND/OR LIQUIDS

(71) Applicant: STARFORT DES STUBENRUSS MORITZ, Bressanone (IT)

(72) Inventor: Moritz Stubenruss, Bressanone (IT)

(73) Assignee: STARFORT DES STUBENRUSS MORITZ (IT)

( * ) Notice: Subject to any disclaimer, the term of this patent is extended or adjusted under 35 U.S.C. 154(b) by 386 days.

(21) Appl. No.: 15/500,361

(22) PCT Filed: Jul. 14, 2015

(86) PCT No.: PCT/EP2015/066023
§ 371 (c)(1),
(2) Date: Jan. 30, 2017

(87) PCT Pub. No.: WO2016/020150
PCT Pub. Date: Feb. 11, 2016

(65) Prior Publication Data
US 2017/0210069 A1    Jul. 27, 2017

(30) Foreign Application Priority Data
Aug. 5, 2014   (IT) .............................. BZ2014A0029

(51) Int. Cl.
*B29C 64/209*      (2017.01)
*B29C 48/00*       (2019.01)
(Continued)

(52) U.S. Cl.
CPC .............. *B29C 48/00* (2019.02); *B29C 48/02* (2019.02); *B29C 48/92* (2019.02); *B29C 64/106* (2017.08);
(Continued)

(58) Field of Classification Search
None
See application file for complete search history.

(56) References Cited

U.S. PATENT DOCUMENTS 5,656,230 A * 8/1997 Khoshevis ................ B28B 3/20
264/401
5,764,521 A * 6/1998 Batchelder .............. B29C 41/36
700/196

(Continued)

FOREIGN PATENT DOCUMENTS

JP   2004154740 A   6/2004
JP   2006248231 A   9/2006
JP   2010517830 A   5/2010

OTHER PUBLICATIONS

International Search Report for Application No. PCT/EP2015/066023 dated Oct. 1, 2015.

(Continued)

*Primary Examiner* — Jeffrey M Wollschlager
*Assistant Examiner* — Armand Melendez
(74) *Attorney, Agent, or Firm* — Tarolli, Sundheim, Covell & Tummino LLP

(57) ABSTRACT

The invention relates to a granule/liquid flow adjusting device for 3-D printer heads supplied with granules and/or liquids, said device being arranged in a 3-D printer head which is fed via a channel. The printer head comprises a chamber, and the chamber has a surface, said surface having at least one outlet bore. According to the invention, at least one conveyor is arranged within the chamber, said conveyor supplying the material, preferably plastic, to the at least one outlet bore. The conveyor is urged in the direction of the surface by force, and the distance between the conveyor and the surface is adjusted by the pressure of the material.

14 Claims, 7 Drawing Sheets

Figure 1:
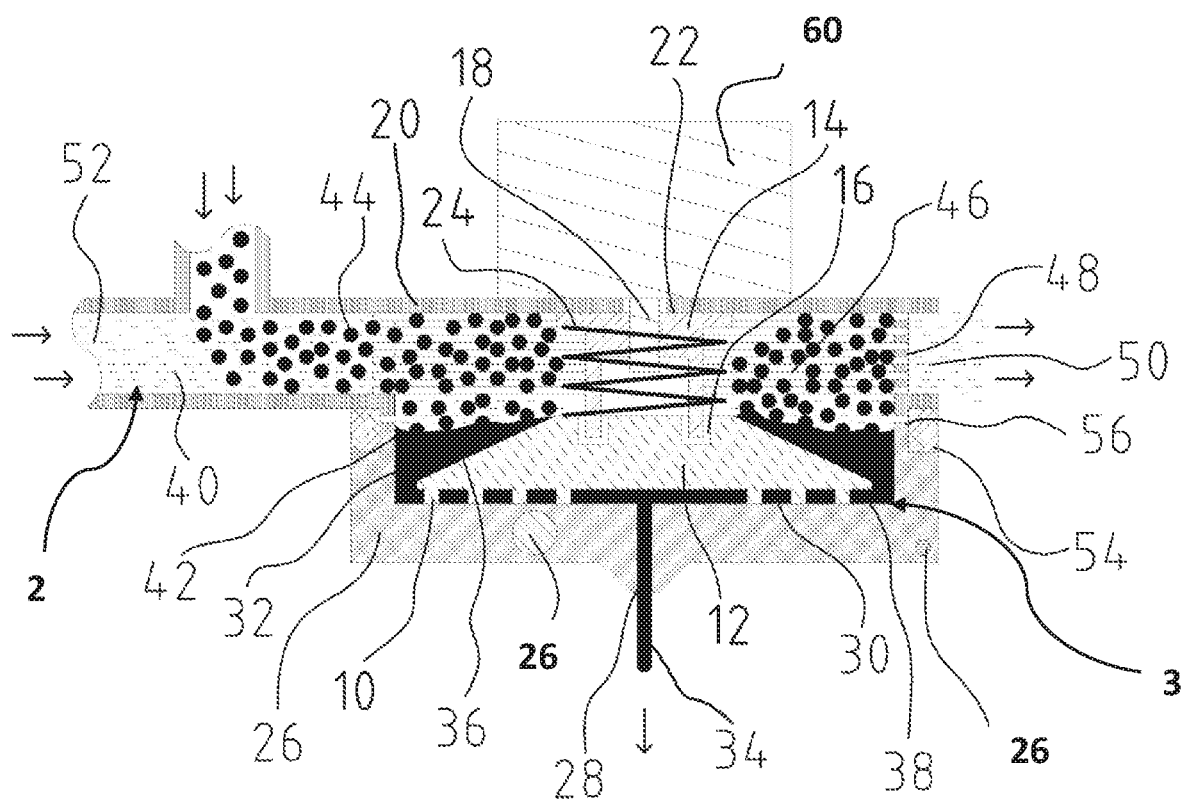

(51) Int. Cl.
    *B29C 64/106*    (2017.01)
    *B29C 64/20*     (2017.01)
    *B29C 48/92*     (2019.01)
    *B29C 48/02*     (2019.01)
    *B29C 64/00*         (2017.01)
    *B29C 45/27*         (2006.01)

(52) U.S. Cl.
    CPC .............. *B29C 64/20* (2017.08); *B29C 45/27* (2013.01); *B29C 64/00* (2017.08)

(56) References Cited

U.S. PATENT DOCUMENTS

| | | | | |
|---|---|---|---|---|
| 6,527,142 | B1* | 3/2003 | Ikushima | B05C 5/0225 |
| | | | | 222/61 |
| 2001/0033040 | A1* | 10/2001 | Cardona | B29C 44/3446 |
| | | | | 264/51 |
| 2002/0113331 | A1* | 8/2002 | Zhang | B29C 41/003 |
| | | | | 264/40.1 |
| 2007/0097782 | A1* | 5/2007 | Uphus | B29C 48/565 |
| | | | | 366/80 |
| 2007/0184146 | A1* | 8/2007 | Takeuchi | B29C 45/464 |
| | | | | 425/451.9 |
| 2012/0237631 | A1 | 9/2012 | Jenko | |
| 2013/0307194 | A1* | 11/2013 | Elsey | B29C 67/0055 |
| | | | | 264/401 |
| 2016/0008887 | A1* | 1/2016 | Earle | B28B 1/001 |
| | | | | 425/78 |

OTHER PUBLICATIONS

Japanese Office Action for Patent Application No. 2017-526749 dated Jul. 23, 2019.

\* cited by examiner

GRANULE/LIQUID FLOW ADJUSTING DEVICE FOR 3-D PRINTER HEADS SUPPLIED WITH GRANULES AND/OR LIQUIDS

RELATED APPLICATIONS

The present invention is a U.S. National Stage under 35 USC 371 patent application, claiming priority to Serial No. PCT/EP2015/066023, filed on 14 Jul. 2015; which claims priority from IT BZ2014A000029, filed 5 Aug. 2014, the entirety of both of which are incorporated herein by reference.

The present invention relates to a granule/liquid flow adjusting device for 3D printer heads supplied with granules and/or liquids according to the preamble of claim 1. A screw feed system for 3D printers that are supplied with granules is known from US 20120237631. During the operation of the printer, the problem has often arisen of heat transfer occurring from the printer head to the supplied granules. This results in adhesion of the granules in the feed channel of the printer head and/or in the feed screw. This adhesion of the granules can cause irregular material flow, particularly in the case of plastic granules. When there is irregular material flow in the direction of the printer head, the problem arises of the formation of an irregular layer, resulting in inconsistent thicknesses of the material being applied. For example, one portion could be thinner, whereas a second portion might be excessively thick.

It is the object of the present invention to provide a granule/liquid flow adjusting device for 3D printer heads supplied with granules and/or liquids, particularly for plastic granules.

The object is achieved by a device according to the characterizing part of claim 1.

The device according to the invention is disposed in a 3D printer head supplied with granules and/or liquids. The 3D printer head is supplied via a channel with granules and/or liquids which are made of plastic, for example. The feed channel conducts the granules and/or liquids into a chamber that can have a heating plate on the lower side with an opening from which the molten or liquid material can emerge. According to the invention, a conveyor or a radial conveyor is disposed so as to be substantially centered on the opening and resting against the plate. This conveyor is actuated by means of a drive—for example a drive disc that is connected to a drive, which can be an electric motor. A rotationally fixed coupling is preferably interposed between the drive and the radial conveyor. Furthermore, a resilient element is interposed between the radial conveyor and the drive in order to have a force act on the radial conveyor. This resilient element can be a spring, for example. In another embodiment, the force can be generated by a weight and/or by the self-weight of the drive. In another embodiment, the force is generated by a magnet, for example an electromagnet.

The front-side radial conveyor conducts the material in the direction of the opening or returns it in the direction facing away from the opening. If the pressure between the heating plate and the radial conveyor becomes too high and too much material is being discharged via the opening, then the resilient element is compressed, and the radial conveyor is raised. In this way, distance of the radial conveyor from the heating plate is increased as a function of the pressure, and its effectiveness decreases as a function of the pressure.

In another embodiment, the heating plate is rotated and the radial conveyor remains stationary.

In that case, the front-side plate is connected to the drive.

In another embodiment, the pressure is detected and the speed of the radial conveyor and/or of the front-side heating plate is adjusted as a function of the pressure in order to achieve a constant flow of material.

The features and details of the granule flow adjusting device for 3D printer heads supplied with granules follow from the patent claims and from the following description of a preferred exemplary embodiment, which is illustrated in the enclosed drawing.

Figure 2:
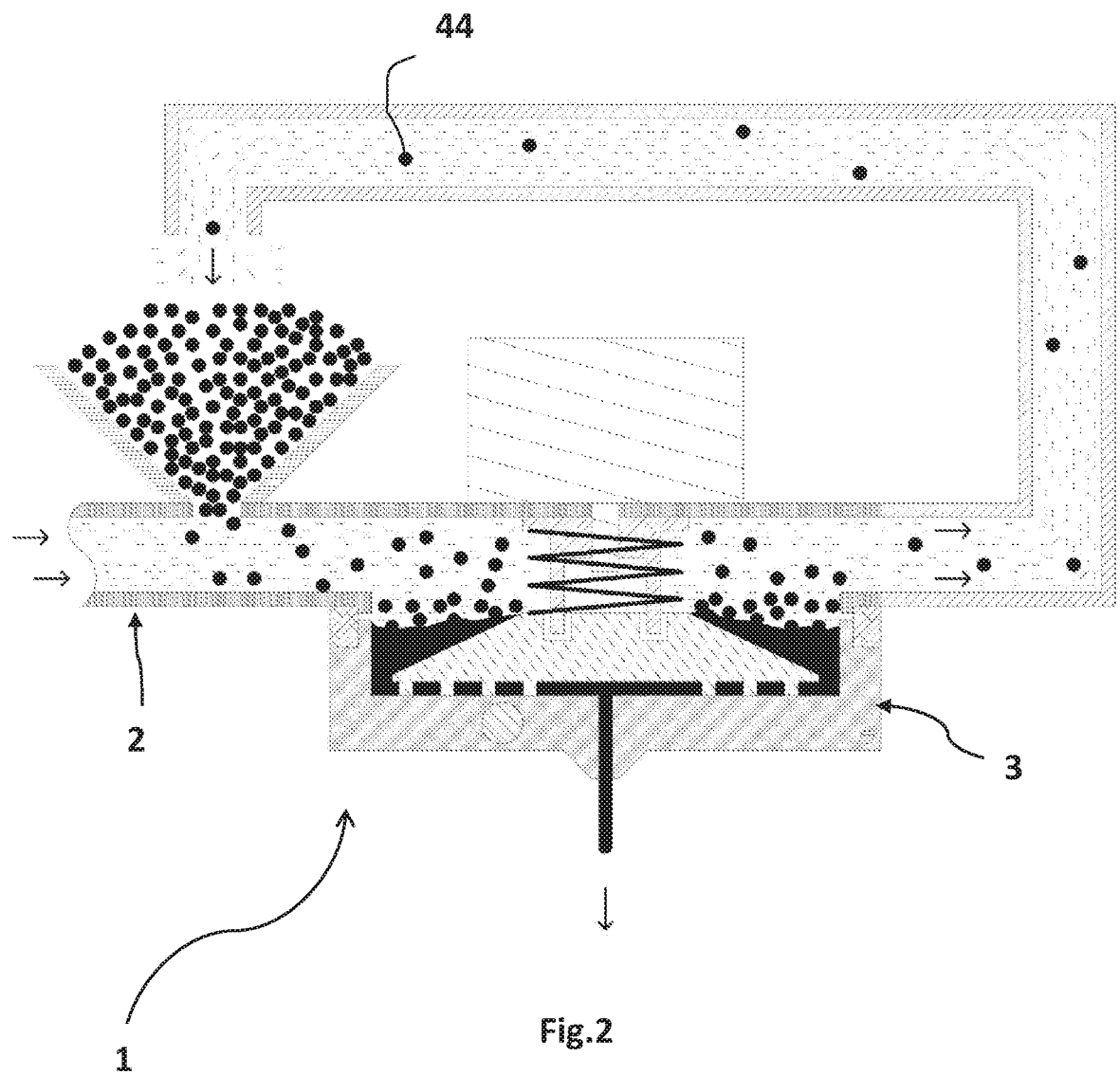
Figure 3:
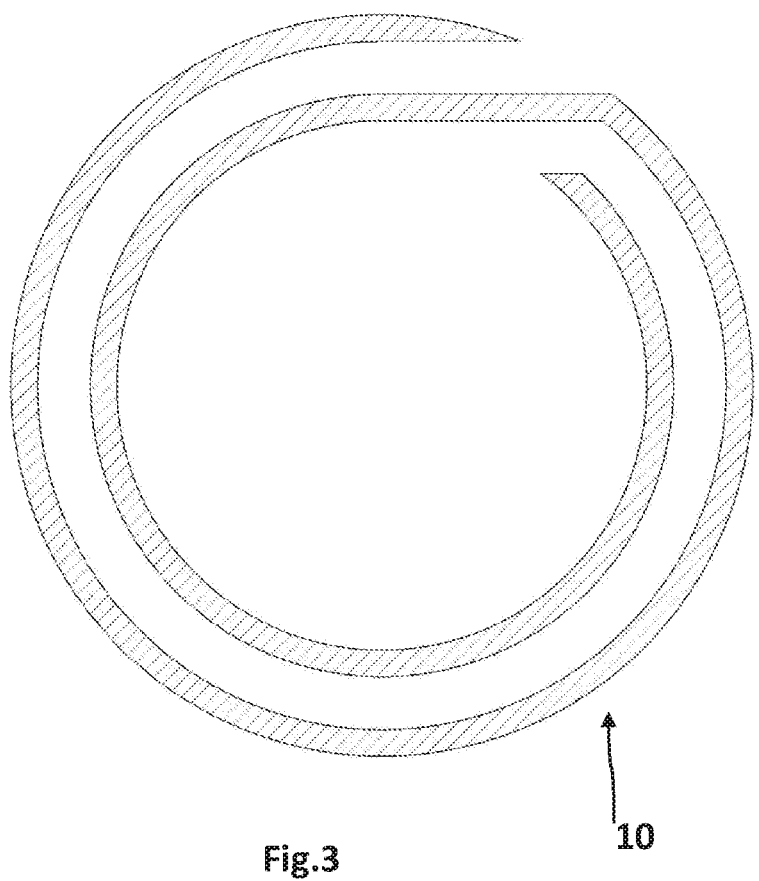
Figure 4:
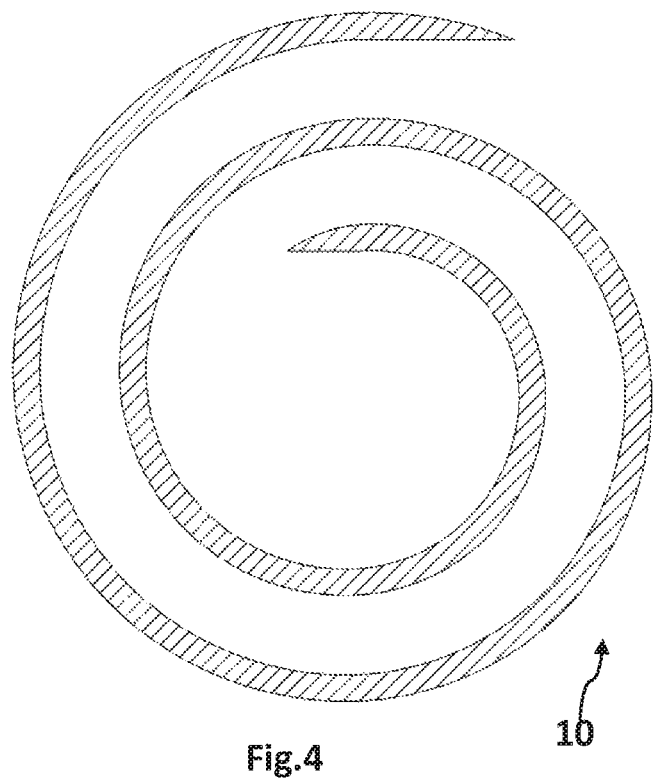
Figure 5:
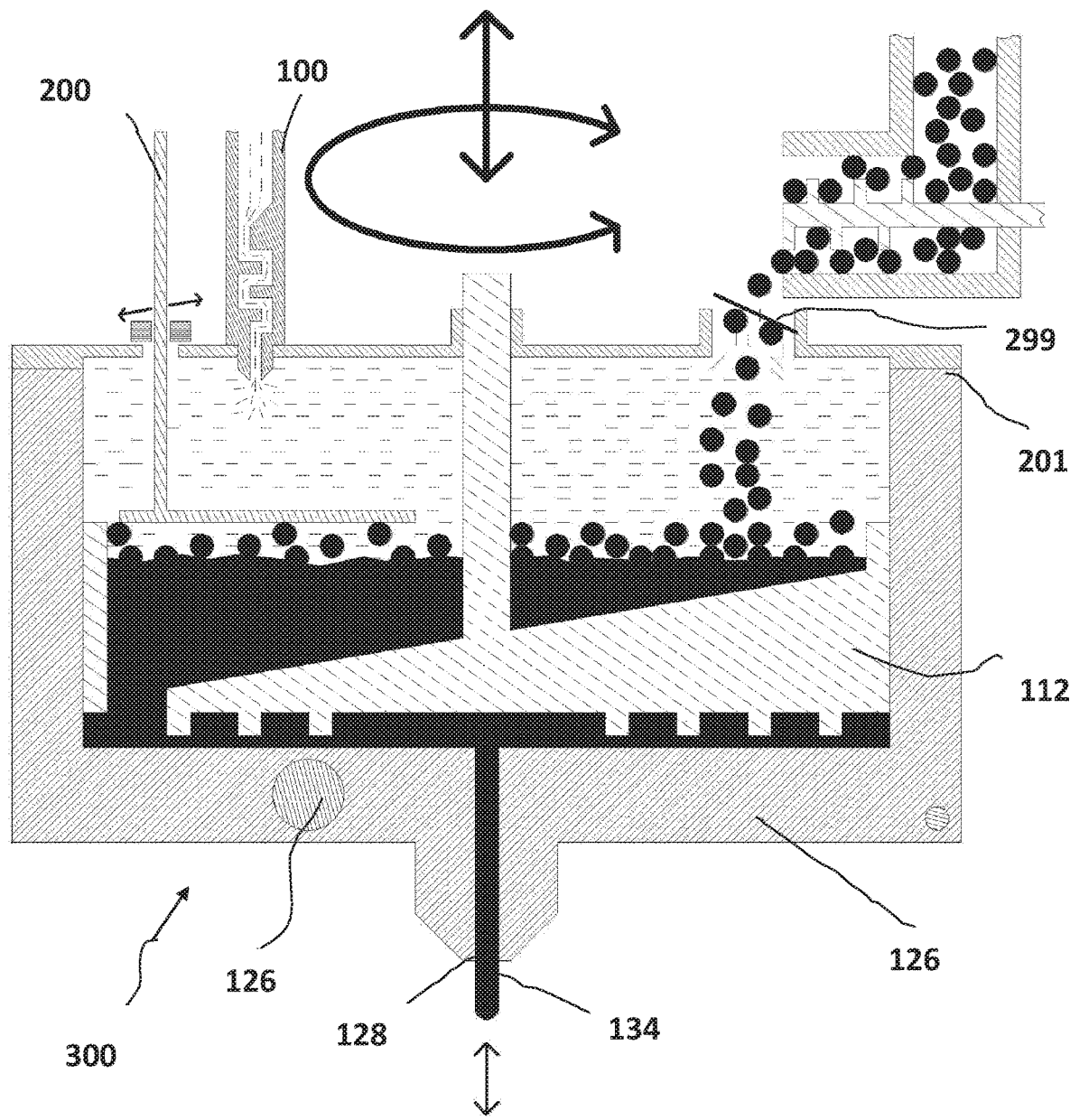
Figure 6:
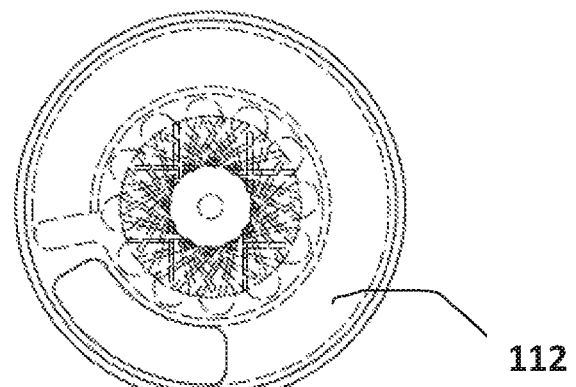
Figure 7:
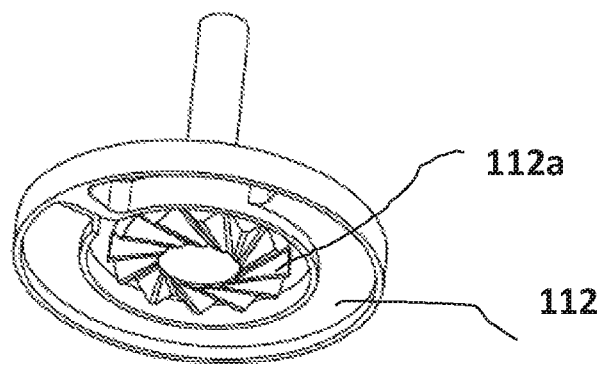
Figure 8:
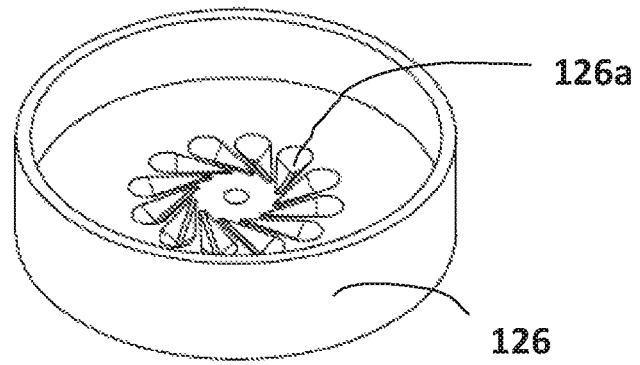
Figure 9A:
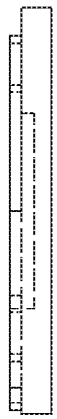
Figure 9B:
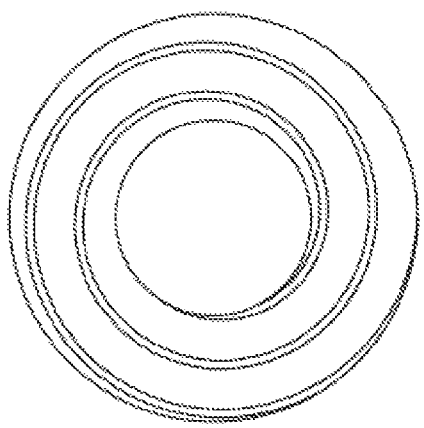
Figure 9C:
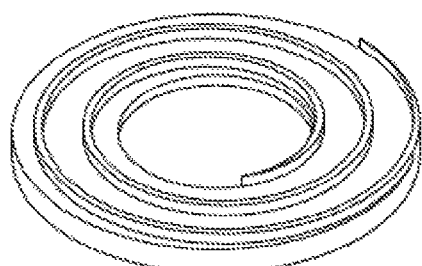
Figure 10A:
Figure 10B:
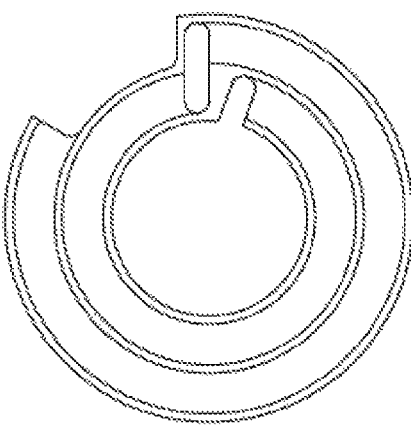
Figure 10C:
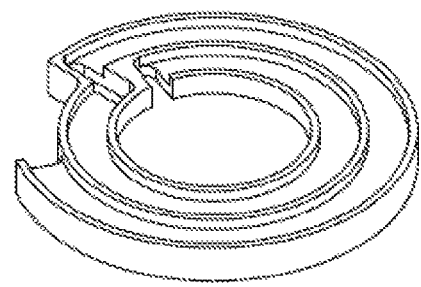
Figure 11:
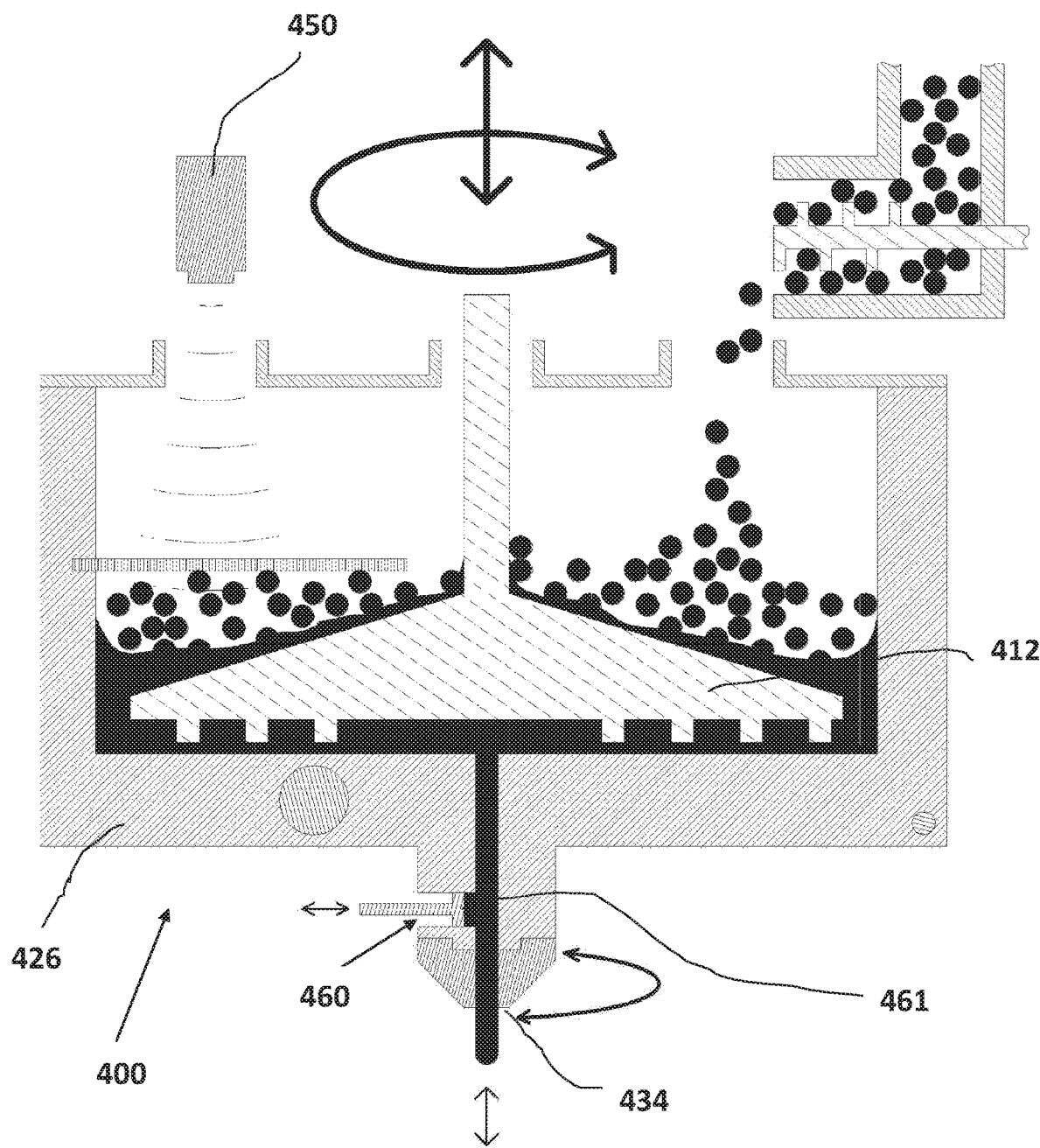

FIG. 1 shows a cross section of a granule flow adjusting device for 3D printer heads supplied with granules according to the invention with reference number 1, FIG. 2 shows a cross section of a granule flow adjusting device for 3D printer heads supplied with granules according to the invention, FIG. 3 shows a front elevation of a spiral conveyor, FIG. 4 shows a front elevation of another spiral conveyor, FIG. 5 shows a cross section of another embodiment of a granule flow adjusting device for 3D printer heads supplied with granules according to the invention with reference number 300, FIG. 6 shows a view of another spiral conveyor from below, FIG. 7 shows a 3D view of a spiral conveyor from FIG. 6, FIG. 8 shows a 3D view of a heating plate, FIG. 9a shows a side elevation, 9b a front elevation, and 9c shows a top view of another spiral conveyor, FIG. 10a shows a side elevation, 10b a front elevation, and 10c shows a top view of another spiral conveyor, and FIG. 11 shows a cross section of another embodiment of a granule flow adjusting device for 3D printer heads supplied with granules according to the invention with reference number 400.

In the case of the present extruder unit, no cylindrical auger is provided for transporting and mixing the plastic to be extruded, but rather a spiral conveyor in whose spiral-shaped channel the material is conveyed. The spiral conveyor 10 is recessed radially from a disc 12. The disc 12 is connected to a coupling 14 that is engaged between the teeth 16 and axial recesses of the disc 12 such that the disc 12 is connected to the coupling 14 in a rotationally fixed but axially displaceable manner. A coil spring 24 is braced between the coupling 14 and the front side of the disc. The coupling 14 is securely connected to a drive shaft 18 of a drive 60 (shown schematically). Moreover, the coupling 14 can be displaced on the housing 20 via a sliding connection 22 that absorbs the axial load and allows the heat on the housing 20 to flow off.

The spring 24 presses against the disc 12 and thus the conveyor 10 against a heating plate 26, which is heated in a known manner by a heat source and the temperature of which is monitored by a thermometer. If the conveyor 10 is caused to rotate, then the plastic is pushed forward. Depending on the direction of rotation, the plastic can be displaced toward or away from the outlet opening 28. The resilient force curbs fluctuations at the outlet 34 for the material, which is preferably embodied as a nozzle, which is known in relation to conventional extruders. If the pressure between the conveyor 10 with its disc 12 and the heating plate 26, and if too much plastic is being discharged, then the conveyor 10 is lifted by means of its disc 12, thereby reducing the effectiveness of the conveyor 10. When the conveyor 10 is lifted by means of its disc 12, the plastic is able to flow in a channel section 30 lying completely on the outside, thereby reducing the pressure. The elastic pressure, rotational speed, and dimensions of the outlet opening 28 should be selected such that the conveyor 10 lifts easily off of the mating surface with its disc 12 in the presence of moderate pressure, so that the effectiveness can be increased as the pressure decreases. The conveyor 10 with its disc 12 and the heating plate 26 can also be cone-shaped.

The plastic 32 already begins melting on the upper side 36 and/or to the side of the conveyor 10 with disc 12 and flows from there toward the inlet 38 of the channel. The flat construction of the conveyor 10 has an outside diameter in the region of the outer inlet 38 of the channel where the molten plastic collects that is substantially larger than a cylindrical worm, which improves the feeding of the plastic if the plastic 32 is first melted.

During injection molding or standard constructions using the 3D printer heads, the plastic melts between the screw conveyor and the cylinder. The melting on a relatively large surface before entry into the conveyor has the advantage that the water contained in the plastic can flow off more readily, thus reducing bubble formation.

A cooling flow 40 flows above the molten pool that conveys away moisture and simultaneously cools the granulate off before dipping into the molten pool 42 so that it does not clump and endanger the replenishment of plastic granulate 44.

The airflow also cools the housing or the chamber above the molten pool, so the heat of the heating plate 26 and of the plastic 32 is not fully transferred by components the heating of which could be disadvantageous. This effect can be enhanced by cooling fins 46 on the interior. The region in which the airflow 40 emerges from the housing is structured such that the plastic granulate 44 remains in the housing, for example in the form of a screen.

The plastic granulate 44 can be introduced immediately from the housing 40. Material such as a fiber—a glass fiber, for example—can be mixed in which the plastic granulate 44. In this way, the strength or other characteristics of the end product can be increased.

The region in which the airflow 40 leaves the housing 20 (outlet of the airflow 50) can also be structured such that the plastic granulate 44 can be returned. A desired quantity of plastic granulate 44 remains in the housing above the molten pool 42, while the rest is blown away again and conveyed into the granulate reservoir, where it can be taken up again to the airflow that had previously conveyed it toward the housing 20. This offers the advantage that great distances from the granulate reservoir to the extruder can be bridged over without the occurrence of sizable fluctuations in the supply of plastic granulate 44 and cooling air 52, which can of course occur at the screen as a result of a backup of the plastic granulate 44.

The cooled housing 20 and the heated heating plate 26 are made of materials that are good heat conductors but are thermally insulated from one another by means of a thermal insulator 54. On the interior of the housing 20, the housing 20 and the heating plate 24 are moved closer together so that the plastic 32 is in contact in the liquid state or does not bind due to melting, thus preventing it from being welded in place. In order to enable the thermally insulating material to be sufficiently wide, the housing 20 and the heating plate 26 can be brought together with lips on the interior.

Among the advantages in comparison to a printer head that draws upon the material from plastic filaments, it should be noted that plastic is substantially cheaper to acquire and that the selection of various plastics is substantially extensive in granulate form. One example is glass fiber-reinforced polyamide, which is very stable and shrinks substantially less upon cooling and produces a better pressure casting result. The raw material can be predried, which can result in breakage in the case of filaments, thus leading to drops in pressure upon reaching the drive wheel. The drying of the plastic reduces the formation of bubbles during processing. The printing process is not limited to a filament length that covers only a few kg. Printers that process industrial granulate are practically unavailable, since they are usually do-it-yourself constructions that generally process plastics having a lower processing temperature and poor mechanical characteristics. There is the problem with heat insulation, which can result in unwanted adhesion of the granulate. This can lead to interruptions in the material supply. Another problem is the irregular discharging of the material, especially in the case of plastics having a relatively high processing temperature, which is caused by many factors in the melting region and generally results in an unusable product.

In a preferred embodiment 300, a tactile sensor 200 is introduced into the printer head. This tactile sensor 300 detects the height of the material within the printer head and, when a predetermined material height is exceeded, restricts the supply. For example, the speed of the feed unit 201 is restricted, or it is completely halted. In an advantageous embodiment, at least one closure element 299 is disposed on the chamber at the feed unit for material 201 in order to reduce the leaking of gas.

In an advantageous embodiment, this tactile sensor 200 is an L-shaped element that is rotatably mounted on the printer head.

In another embodiment, gas—argon, for example—can be introduced into the printer head through a feed unit 100. By virtue of this gas supply, the granulate being heated is isolated before it comes into contact with the ambient air. This isolation prevents a reaction with the air. Moreover, this gas can possess advantageous characteristics in terms of heat conduction.

In a preferred embodiment 300, one or more closure elements 299 are installed in the printer head at the material feed. These can be arranged serially in order to prevent air from getting into the printer head chamber.

In FIG. 5, the disc 112 is embodied such that it does not lift off toward the center, but toward one side. Through the rotation of the disc 112, a continuous flow is produced, thereby preventing the plastic from coming into contact with the side wall of the chamber. Contact between the outer wall and the material can lead to solidification or segregation of material that is added to the granulate, such as glass fibers.

The disc can have both a rotational movement and a vertical movement. According to the invention, this vertical movement extends away from the heating plate 126 when excessive pressure acts on the molten plastic so that too much material 134 is emerging from the printer head, and it moves closer to the heating plate 126 when the pressure on the liquid plastic drops.

FIGS. 6 and 7 show an especially advantageous disc 112. As a result of the raised areas 112*a*, the material is pushed continuously toward the outlet opening 128.

FIG. 8 shows recesses 126*a* in the heating plate. These advantageously enable the flow of material toward the outlet opening to be improved.

FIGS. 9*a*, 9*b*, 9*c* and 10*a*, 10*b*, 10*c* show other advantageous discs 112. These discs optimize the supply of the material to the outlet opening through predefined channels, which support the adjustment of the quantity of discharged material by virtue of their spiral-shaped arrangement.

FIG. 11 shows another printer head 400 according to the invention. For example, it comprises an ultrasonic device or an infrared device 450 for identifying the material height and thus regulating the feed. The printer head 400 comprises a suction unit 460. This is arranged directly over the outlet opening 434. The suction unit 460 comprises a chamber 461 which, with the discharge channel 462, connects the interior space of the printer head 400 to the outlet opening 434.

A plunger 463 is displaceably disposed in the chamber 461. This plunger is connected to an actuator. Upon completion of the printing procedure, it is activated in order to prevent dripping of the material; to this end, the plunger moves and allows the chamber 461 to receive material. When the printing process is resumed, the material is pushed again into the channel. By virtue of the fact that the chamber 461 is in contact with the heating plate 426, the material remains molten.

In another advantageous embodiment of the invention, the outlet opening 434 is embodied such that it is able to rotate about its own axis. In this way, the material that travels through the outlet opening 434 is caused to rotate. This enhances the use of the material stream in the case of arcuate printing plates, for example.

Moreover, the material is thus corded, thereby preventing the formation of threads.

Upon conclusion of printing, a predetermined breaking point is created by the rotation of the outlet opening.

In an embodiment that is not shown, a liquid two-component plastic is used instead of a granulate. This is also fed to the outlet opening via the conveyor.

In a preferred embodiment, a UV radiator is disposed on the printer head.

This enables a plastic that is discharged through the printer head to be crosslinked.

Finally, it is clear that amendments or alterations can be made to the granule/liquid flow adjusting device for printing heads supplied with granules and/or liquids or variants thereof that are readily apparent to a person skilled in the art can be produced without going beyond the scope of protection established by the enclosed patent claims.

REFERENCE NUMBERS

Printer head 1
Gas supply 2
Interior 3
Spiral conveyor 10
Disc 12
Coupling 14
Teeth 16
Drive shaft 18
Housing 20
Sliding connection 22
Spring 24
Heating plate 26
Outlet opening 28
Channel section 30
Plastic 32
Outlet 34
Upper side of disc 36
Channel inlet 38
Cooling flow 40
Molten pool 42
Plastic granulate 44
Cooling fins 46
Screen 48
Airflow 50
Cooling air 52
Thermal insulators 54
Drive 60
Gas feed unit 100
Disc 112
Raised area 112*a*
Heating plate 126
Recess 126*a*
Outlet opening 128
Material 134
Tactile sensor 200
Material feed unit 201
Closure element 299
Printer head 300
Printer head 400
Conveyor 412
Heating plate 426
Outlet opening 434
Ultrasonic device, infrared device 450
Suction unit 460
Chamber 461
Outlet channel 462
Plunger 463

The invention claimed is:

1. A granule/liquid flow adjusting device for 3D printer heads supplied with granules and/or liquids as printing material, arranged in a 3D printer head fed via a channel, wherein
the printer head comprises a chamber, wherein
the chamber has a surface, wherein the surface is heatable and
said surface has at least one outlet opening,
at least one spiral conveyor comprising a disc having an upper side and a lower side and at least one spiral-shaped channel on the lower side for conveying the printing material is arranged within the chamber and is configured to feed the material flowing from the upper side of the disc to the at least one outlet opening,
a force generator is provided and configured to apply a force to the spiral conveyor toward the surface, and
the disc is connected to the force generator in a rotationally fixed and axially displaceable manner such that the distance between the spiral conveyor and the surface is adjustable based on the pressure of the material.

2. The device as set forth in claim 1, characterized in that the material is granulate, or, that the material is liquid two-component plastic.

3. The device as set forth in claim 1, characterized in that the force generator is a spring acting on the spiral conveyor, or the force generator is a weight and/or a tare weight of a drive of the spiral conveyor.

4. The device as set forth in claim 1, characterized in that the force generator is designed as magnetic or electromagnetic element acting on the spiral conveyor.

5. The device as set forth in claim 1, characterized in that the relative speed between a lower surface of the chamber and the spiral conveyor is adjustable as a function of the pressure of the material.

6. The device as set forth in claim 1, characterized in that a UV lamp is mounted on the printing head in order to harden the plastic.

7. The device as set forth in claim 1, 3, 4 or 5, characterized in that the spiral conveyor, the disc and the surface of the chamber are cone-shaped.

8. The device as set forth in claim 1, characterized in that at least one suction unit is arranged above the outlet opening, wherein the suction unit comprises a chamber, which connects an interior space of the printer head containing the spiral conveyor with the outlet opening by an outlet channel, wherein in the chamber a piston connected to an actuator is movably arranged.

9. The device as set forth in claim 1, characterized in that the device has at least one sensor for measuring the material height in an interior space of the chamber.

10. The device as set forth in claim 9, characterized in that the sensor is a tactile sensor.

11. The device as set forth in claim 9, characterized in that the sensor is an ultrasonic device or an infrared device.

12. The device as set forth in claim 1, characterized by a feed unit for gas for feeding of gas into an interior space of the chamber.

13. The device as set forth in claim 11, characterized in that at least one closure element is disposed on the chamber at the feed unit for material in order to reduce the leaking of gas.

14. The device as set forth in claim 1, characterized in that the outlet opening is rotatable.

* * * * *